United States Patent
Forbes et al.

(10) Patent No.: US 7,200,171 B2
(45) Date of Patent: Apr. 3, 2007

(54) SYSTEM AND METHOD FOR ESTIMATING INITIAL CHANNEL QUALITY IN A MULTIRATE SYSTEM

(75) Inventors: Stephen K. Forbes, Raleigh, NC (US); Phillip Marc Johnson, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 744 days.

(21) Appl. No.: 10/248,447

(22) Filed: Jan. 21, 2003

(65) Prior Publication Data

US 2004/0141551 A1    Jul. 22, 2004

(51) Int. Cl.
*H04B 17/00* (2006.01)
*H04B 3/46* (2006.01)
*H03K 5/01* (2006.01)

(52) U.S. Cl. ...................... 375/224; 375/346
(58) Field of Classification Search ............... 375/224, 375/227, 346, 350; 704/221
See application file for complete search history.

(56) References Cited

U.S. PATENT DOCUMENTS

2001/0008542 A1* 7/2001 Wiebke et al. ............. 375/141
2002/0174376 A1* 11/2002 Classon et al. ............. 714/4
2004/0141551 A1* 7/2004 Forbes et al. ............... 375/224

FOREIGN PATENT DOCUMENTS

WO      WO 99/62213 A    12/1999

OTHER PUBLICATIONS

"A robust low complexity algorithm for carrier-to-interference ratio estimation in GSM", Nangia, V.; Nowack, J.M.; IEEE vol. 2, May 2002, pp. 731-735.*
"ETSI E N 3 01 7 09, v.7.0.2. Digital cellular telecommunications system (Phase 2+); Link adaptation (GSM 05.09 version 7.0.2 Release 1998)" Dec. 1, 2999 pp. 1-13.
International Search Report, PCT/IB2004/000043, May 28, 2004, Sony Ericsson Mobile Communications AB.
Written Opinion, PCT/IB2004/000043, May 28, 2004, Sony Ericsson Mobile Communications AB.

* cited by examiner

*Primary Examiner*—Mohammed Ghayour
*Assistant Examiner*—Aslan Ettehadieh
(74) *Attorney, Agent, or Firm*—Gregory A. Stephens; Moore & Van Allen PLLC (57) ABSTRACT

A method of estimating initial channel quality in a receiver when allocated a new channel in order to select an optimal codec mode in a multi-rate service is disclosed. One implementation initially fills the filter state with the first received channel quality measurement. Another embodiment proportionally fills the entire filter state with the calculated channel quality measurements. Yet another embodiment uses the hysteresis and threshold parameters in conjunction with the initial codec mode to calculate an initial fill value for the filter state.

26 Claims, 7 Drawing Sheets

SYSTEM AND METHOD FOR ESTIMATING INITIAL CHANNEL QUALITY IN A MULTIRATE SYSTEM

BACKGROUND OF INVENTION

The following acronyms are used throughout this description. They are listed in TABLE 1 below for ease of reference.

TABLE 1

| ACRONYM | DEFINITION |
|---|---|
| ACELP | Algebraic Code Excited Linear Prediction |
| ACS | Active Code Set |
| AFS | AMR Full Rate Speech service |
| AHS | AMR Half Rate Speech Service |
| AMR | Adaptive Multi Rate Speech Service |
| BER | Bit Error Rate |
| BSS | Base Station Subsystem |
| BTS | Base Transceiver Station |
| CDMA | Code Division Multiple Access |
| CELP | Code Excited Linear Prediction |
| CHD | Channel Decoder |
| CHE | Channel Encoder |
| C/I | Carrier-to-Interface Ratio (used to measure link quality) |
| CMI | Codec Mode Indication |
| CMC | Codec Mode Command |
| CMR | Coec Mode Request |
| Codec 1 | Lowest Speech bitrate mode in ACS (CMC/CMR/CMI = 0) |
| Codec 2 | $2^{nd}$ lowest bitrate codec if ACS contains 2 or more codecs (CMC/CMR/CMI = 1) |
| Codec 3 | $3^{rd}$ lowest speech bitrate codec if ACS contains 3 or more codecs (CMC/CMR/CMI = 2) |
| Codec 4 | Highest speech bitrate codec if ACS contains 4 codecs (CMC/CMR/CMI = 3) |
| DL | Downlink |
| EDGE | Enhanced Data-rates for GSM (or Global) Evolution |
| EFR | Enhanced Full Rate Speech Codec for GSM |
| FACCH | Fast Associated Control Channel |
| FIR | Finite Impulse Response |
| FR | Full Rate Speech Codec for GSM |
| GSM | Global System for Mobile Communications, Common Digital Cellular Standard |
| HR | Half Rate Speech Codec for GSM |
| ICM | Initial Codec Mode |
| IIR | Infinite Impulse Response |
| MS | Mobile Station, e.g. a cellular phone |
| PDC | Personal Digital Cellular |
| RATSCCH | Robust AMR Traffic Synchronized Control Channel |
| SACCH | Slow Associated Control Channel |
| SPD | Speech Decoder |
| SPE | Speech Encoder |
| TDMA | Time Division Multiple Access |
| TCH | Traffic Channel |
| TRAU | Transcoding and Rate Adapting Unit |
| UL | Uplink |
| WCDMA | Wideband-CDMA |
| 3GPP | $3^{rd}$ Generation Pasrtnership Project, WCDMA Standard |

Digital communications systems, such as digital cellular telephony systems, are often used to transmit voice. Due to the limited bandwidth of these systems, speech is typically encoded to a low bit rate using a speech encoder. Various methods are in use for such speech coding. Within modern digital cellular telephony, most of these methods are based upon Code Excited Linear Prediction (CELP) or some variant thereof. Such speech codecs are standardized and in use for all of the major digital cellular telephony standards including GSM/EDGE, PDC, TDMA, CDMA, and WCDMA.

The present invention is described within the context of GSM. Within this standard, there are currently four standardized speech services; three of which are fielded and in common use. The original speech codec is known as the full-rate (FR) codec. This was followed by the half-rate (HR) speech codec which required only half of the bandwidth of the FR codec thereby allowing cellular operators to support twice as many users within the same frequency allocation. This was followed by the Enhanced Full Rate (EFR) speech codec which required the same net bit rate (after channel coding) as the original FR codec but with much improved speech quality.

The GSM standard recently introduced the AMR speech codec. This speech codec will also be used in forthcoming EDGE and 3GPP cellular systems.

Basic AMR Operation—The AMR speech service is fundamentally different from fixed-rate codecs in that multiple speech rates are defined and the speech rate may be changed dynamically. For each speech rate, a channel coding scheme is defined. The speech rate may be altered in order to match the channel coding to the link quality. There is both a half-rate and full-rate mode of AMR operation.

The AMR speech service has capacity and speech quality advantages over preceding GSM speech codecs. The capacity increase is largely a consequence of there existing a half-rate option in addition to the full rate. Because the ACELP technology underlying the AMR codec is superior to that of the original HR speech codec, the AMR half rate codec will likely be acceptable with respect to speech quality (unlike its HR predecessor).

The adaptive nature of the AMR codec also serves to increase capacity. Because the channel coding can be increased dynamically as needed, additional coding gain is possible meaning that acceptable operation at a lower C/I ratio is possible. Because GSM systems are typically interference-limited (as compared to noise-limited), a lower average C/I ratio effectively means it is possible to put more users on the same system.

Considering only the full-rate AMR service, the speech quality perceived by the user is improved over the fixed-rate speech codecs (FR, EFR). As an AMR user encounters poor channel conditions, e.g. at the edge of a cell or within a fade, the speech rate is reduced and the channel coding increased. The reduced speech rate leads to a lower but acceptable speech quality. This dynamic change is performed in a controlled manner such that the BER into the speech decoder is always kept at acceptable levels. With a fixed-rate speech codec under similar conditions, the bit error rate (BER) into the speech decoder would quickly reach unacceptable levels leading to degraded speech quality out of the decoder.

Figure 1:
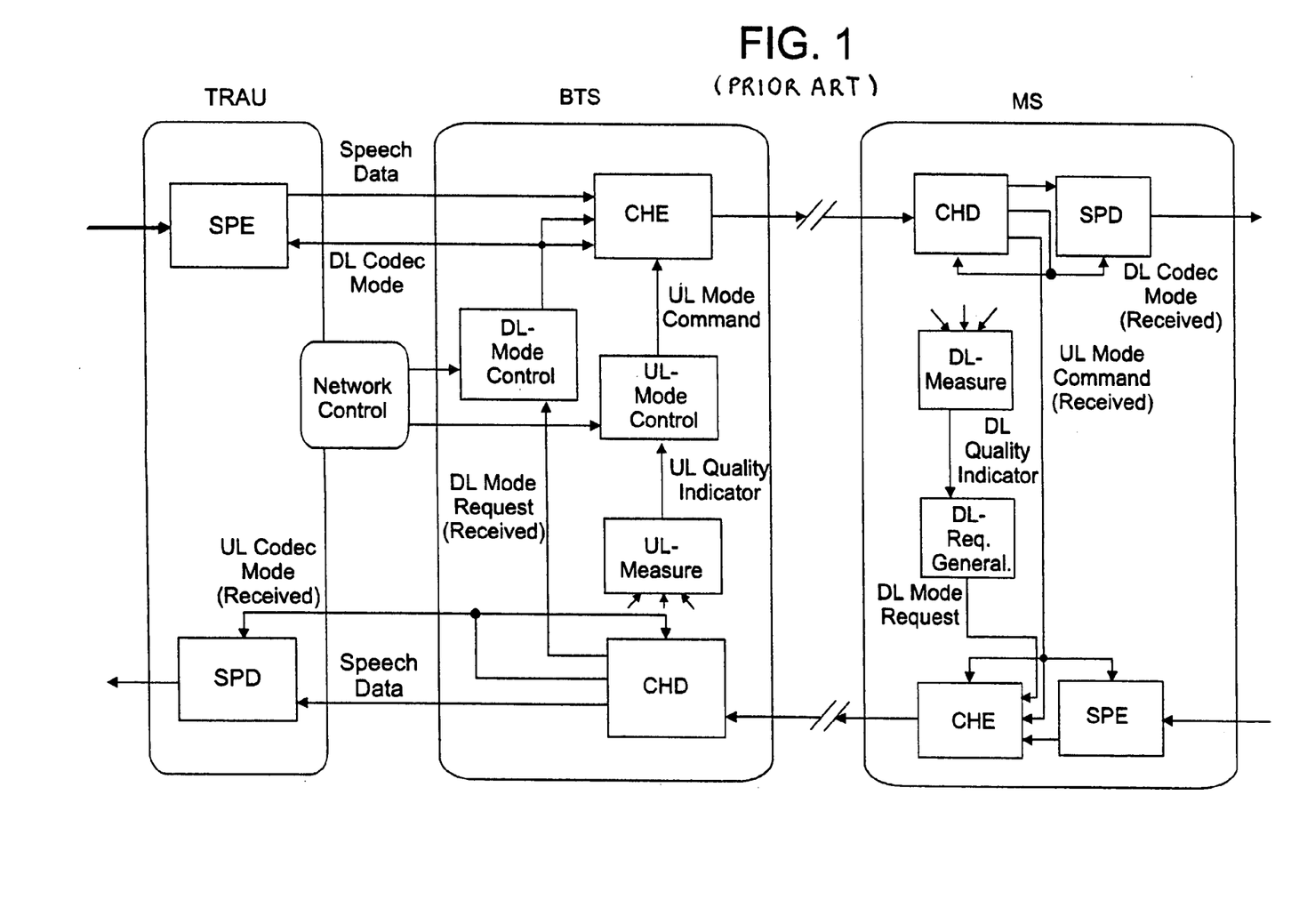
FIG. 1 illustrates a high level block diagram of a basic AMR speech system.

A high-level block diagram of a complete AMR system is illustrated in FIG. 1. The AMR system is incorporated within the major GSM base station components TRAU and BTS on the network side and the MS or mobile terminal on the portable equipment side.

On the network side, the speech encoder (SPE) and channel encoder (CHE) as well as channel decoder (CHD) and speech decoder (SPD) are connected via the serial A-bis interface. For each link, quality information is derived by estimating the current channel quality. Based on the channel quality, and also taking into consideration possible constraints from network control, the codec mode control, which is located on the network side, selects the codec modes to be applied.

The channel mode to use (TCH/AFS or TCH/AHS) is controlled by the network. Uplink and downlink always apply the same channel mode.

In order to achieve the benefits of having multiple codec rates and codec schemes, it is important to choose the optimal codec rate for a given link (channel condition) at a given time. This is accomplished via a closed loop control mechanism wherein the network actually controls the rates on both links based on a channel quality measure.

For codec mode adaptation the receiving side performs link quality measurements of the incoming link. The measurements are processed yielding a Quality Indicator. For uplink adaptation, the Quality Indicator is directly fed into the UL mode control unit. This unit compares the Quality Indicator with certain thresholds and generates, also considering possible constraints from network control, a Codec Mode Command indicating the codec mode to be used on the uplink. The Codec Mode Command is then transmitted inband to the mobile side where the incoming speech signal is encoded in the corresponding codec mode. For downlink adaptation, the DL Mode Request Generator within the mobile compares the DL Quality indicator with certain thresholds and generates a Codec Mode Request indicating the preferred codec mode for the downlink. The Codec Mode Request is transmitted inband to the network side where it is fed into the DL Mode Control unit. This unit generally grants the requested mode. However, considering possible constraints from network control, it may also override the request. The resulting codec mode is then applied for encoding of the incoming speech signal in downlink direction. Both for uplink and downlink, the presently applied codec mode is transmitted inband as Codec Mode Indication together with the coded speech data. At the decoder, the Codec Mode Indication is decoded and applied for decoding of the received speech data.

Codec mode selection is chosen from a set of codec modes (ACS, Active Codec Set), which may include 1 to 4 AMR codec modes. For the full-rate channel, a total of 8 speech codec rates are defined and each has a unique channel code associated with it. For the half-rate service, fewer speech rates are used. The ACS represents a subset of these codec rates. Associated with this set is a list of 0 to 3 switching thresholds and hystereses used by the DL Mode Request Generator and the UL mode control unit to generate the Codec Mode Requests and Codec Mode Commands. These configuration parameters (ACS, thresholds, hysteresis) are defined at call set-up and can be modified at handover or during a call, e.g. via special reconfiguration messages sent on the RATSCCH channel. In addition, separate configuration parameters may be defined for uplink and downlink channels.

Transmittal of the codec mode is done via special inband signaling. This inband signaling is comprised of a 2-bit index into the ACS. The value of interest is channel encoded to 4 bits for AHS and 8 bits for AFS. These bits are allocated within the 456-bit AFS speech frame or the 228-bit AHS speech frame leaving 448 bits and 224 bits, respectively, for the encoded speech frame.

Each coded frame contains only one inband data value and the inband data alternates in meaning. For every other speech frame, the inband data represents the Codec Mode Indication (CMI). The CMI indicates the codec mode used on the link in which it is being transmitted and, hence, how received speech frames should be decoded, i.e. which channel coding to decode. Each CMI must be statically stored in the receiver as it indicates how to decode both the frame in which it was received and the next frame.

The inband data in the remaining frames gives instructions concerning the mode that should be used on the opposite link. For the data in the downlink frames, this field is termed the codec mode command (CMC) as this value commands the MS as to which codec mode to use on the uplink. For the data in the uplink frames, this field is termed the codec mode request (CMR) as this is the codec mode which the MS would like to see used on the downlink. The network will typically use the CMR to drive the downlink codec rate but it is not required to do so.

Given the aforementioned link adaptation, it remains to determine how the optimal codec mode is chosen. This is accomplished by estimating the channel quality for a given link and using this to determine the optimal codec rate from those within the ACS. For simplicity, henceforth only the downlink to the MS receiver will be considered. It is understood that the concepts apply equally to the uplink (BTS receiver).

The channel quality must be monitored by the MS receiver. A GSM receiver already monitors this link and reports RXLEV (received signal strength) and RXQUAL (received signal quality) parameters back to the BTS via SACCH. However, these methods for measuring channel quality are generally not adequate for purposes of AMR link adaptation.

The channel quality for AMR is mapped to a Carrier-to-Interference (C/I) ratio between 0 and 31.5 dB, though the practical range of interest is typically narrower. Multiple methods for estimating this channel quality measurement are possible. The most obvious method is to explicitly estimate the carrier and interferer energies. Other measurement techniques such as estimating BER and mapping it to a C/I value or using Viterbi metrics are possible. The particular method for channel quality estimation is outside of the scope of this disclosure and thus any of the methods are applicable. The only presumption herein is that the channel quality measurement be estimated on each received burst or frame and that it be mappable to a C/I ratio.

The C/I ratio is compared against certain thresholds to calculate the CMR value to be returned to the BTS. In general, a strong signal (C/I ratio) indicates that a high speech rate (low channel coding) may be used on the downlink. A weak signal indicates more channel coding (and a low speech rate) are needed.

The exact thresholds are signaled by the network during AMR configuration, i.e. at the same time as the ACS is defined. In order to prevent the codec mode from oscillating excessively between two rates when the channel quality is near a threshold, hysteresis values are also part of the AMR configuration. In a typical AMR receiver, input bursts of RF data are demodulated and assembled into frames. These are passed to a channel decoder whose results are sent to the speech decoder. In parallel with this, a channel quality measurement is performed based upon inputs from the raw bursts, the demodulator, the channel decoder, and/or the channel decoder input/output data. The channel quality is used to calculate a mode request value.

The channel quality (C/I estimate) is typically measured on a burst (TDMA frame) or speech frame basis. (In AFS, a speech frame is composed of 4 bursts whereas in AHS 2 bursts comprise a speech frame.) Considerable variance will be observed in these measurements due to fast fades, antenna orientation, and other fleeting channel perturbations. Frequency hopping (typical in GSM systems) adds an additional fast-varying source of channel condition changes.

It is not practical to track the fast-varying channel conditions as this would effectively require some prediction that is unfeasible given the randomness. Hence, it is desirable to remove the fast-varying components and concentrate on the long-term average (slow-varying) channel quality. This is achieved by filtering the channel quality estimates measured on a burst or frame basis.

The Link Adaptation standard suggests that a 500 ms (100-tap for AFS bursts, 50-tap for AHS bursts) FIR (moving average) filter be used. For purposes of this disclosure, it is assumed such a filter would be used. It is understood that an alternate filter including a different number of FIR taps and/or poles (IIR filter) may be similarly used within the invention.

When a traffic channel is assigned at the beginning of a call or a new traffic channel is assigned as the result of a handover, the mobile usually begins using it with no prior knowledge of channel quality. Since a filter relies on past values, how the designer chooses to initialize the C/I estimate filter state directly affects initial performance. The simplest approach is to initialize the filter state with a fixed value such as zero. Actual C/I measurements displace the preloaded initial value over time. Given the situation where the ICM is non-optimal for the current RF conditions, the request for the optimal codec mode is delayed until the filter state is dominated by actual measurements.

Consider the case where the mobile is ordered to begin a call using its lowest bit rate codec (this is very common when using implicit rules for startmode) yet the RF channel quality is capable of supporting the highest bit rate codec. The mobile stays at the lower rate codec until enough zeros are displaced that the filtered C/I estimate exceeds the threshold required to request the next highest rate codec in the ACS. This process continues until the highest rate codec is requested. During this process, the user experiences degraded audio until the optimal codec is requested.

Another problem arises when the base station orders the highest-rate codec to be used initially. With the filter state initialized with zeros, it is likely that the mobile will request a lower bit rate codec at the call start based on the first calculation from the filter. The optimal codec is requested only after actual RF measurements dominate the initialization value in the C/I estimate filter. To prevent this startup problem, the ability to request a new codec could be barred until the filter is filled with actual RF measurements. Again this arbitrary implementation results in unnecessarily degraded audio at the beginning of a call (or immediately after handover) even though the radio link quality is capable of supporting the highest bit rate speech codec. Although these preceding examples focus on C/I estimate filters initialized with zero, one skilled in the art recognizes that similar problems exist with any constant value.

The ICM is typically not chosen by the base station arbitrarily at either call setup or handover. The base station is familiar with network aspects that affect channel quality such as the cell layout and the cell loading. A lightly loaded cell in a network having small cells will tend to have good channel quality even at handover. Conversely, a heavily-loaded network or one having large cells will tend to have poor channel quality at a handover. Furthermore, a network usually has some explicit indication of the channel quality as reported by RXQUAL or RXLEV measurements taken by the MS as part of the mobile-assisted handover procedure when changing TCH channels or as part of the SDCCH measurements taken before switching over to the TCH at call setup. Concerning handovers, the network typically requires that the RXLEV reported by the MS for a neighbor cell is better than that of the serving cell before the handover is commanded. Hence, the network always has a rough estimate of the MS's received channel quality.

Given the above, the network is in a better position to determine the ICM that should be used for the downlink to the MS at the beginning of a call or at handover. Hence, the commanded ICM value should be used until the MS can estimate the channel quality with a reasonable degree of confidence, e.g. when the filter is filled with measured rather than initial values.

The issue with the previously described filter initialization is that it effectively overrides the intent of the network when a new channel is assigned. The network is, in this respect, smarter than the MS and in a better position to choose the AMR rate. If the MS initializes to a set value (such as zero), the CMR is forced to a non-optimal codec (the lowest) until the filter is filled with actual measurements.

The problem of a non-optimal codec is probably not too significant at call setup. However, switching to a non-optimal codec at each handover is quite undesirable. Note that a primary scenario (and motivation) for AMR operation is in weak signal conditions, e.g. at cell boundaries. At cell boundaries (e.g., marginal channel quality for large cells or good channel quality in small cells) multiple handovers may occur leading to significant periods of time in which such a non-optimal codec would be used. The problem is further exacerbated if a high-order FIR filter is used. A higher-order filter would effectively lengthen the periods of time during which a non-optimal codec is used.

What is desired is a method for determining initial channel quality estimates that would allow an optimal codec to be used as often as is practical whenever a new RF channel is allocated.

SUMMARY OF INVENTION

The present invention comprises a method of estimating initial RF channel quality in a receiver when using a new RF channel in order to select an optimal codec mode in a multi-rate service. A new RF channel is typically received at call setup or due to a handover.

In one embodiment of the present invention there is disclosed a method of estimating initial RF channel quality in a receiver when receiving a new RF channel in order to select an optimal codec mode in a multi-rate speech service. Channel quality estimates are obtained on a burst or frame basis. A carrier-to-interference (C/I) ratio is then calculated for each incoming burst or frame. A filter comprised of N taps is dynamically initialized with the calculated C/I ratios. In this embodiment, dynamically initializing the filter comprises initializing all N taps of the filter with the first calculated C/I ratio. Finally, the C/I ratios are filtered to remove randomness. The result is a better channel quality estimation that can be used in codec mode selection within the multi-rate speech service.

In another embodiment, dynamically initializing the filter with the calculated C/I ratios comprises proportionally filling the N taps with each calculated C/I ratio such that each calculated C/I ratio is proportionally represented in the filter. Remaining taps due to uneven divisions are filled with the most recent calculated C/I ratio. This method applies until the number of calculated C/I ratios equals ½ the total number of filter taps. New calculated C/I ratios are then input normally, i.e. on a one in/one out basis.

In yet another embodiment, dynamically initializing the filter with the calculated C/I ratios comprises obtaining the number of codec modes for the multi-rate speech service, threshold and hysteresis values for the ACS, and the initial codec mode from a base station that is in communication with the receiver. Next, a value to be used to initialize all N taps of the filter based upon the threshold and hysteresis values of the codec modes is calculated by determining the average value of the initial codec mode using the appropriate threshold and hysteresis values obtained from the base station. Lower practical limits are used when the codec mode is the lowest bit rate codec mode. Similarly, upper practical limits are used when the codec mode is the highest bit rate codec mode.

In still another embodiment, dynamically initializing the filter with the calculated C/I ratios comprises obtaining the number of codec modes for the multi-rate speech service, threshold and hysteresis values for each codec mode, and the initial codec mode from a base station that is in communication with the receiver. Next, a value to be used to initialize all N taps of the filter based upon the threshold and hysteresis values of the codec modes is calculated by adding the hysteresis value to the lower threshold value of the initial codec mode.

DETAILED DESCRIPTION

The present invention is concerned with determining a more reliable and accurate initial channel quality estimate in an AMR system. Initial channel quality estimate refers to the first estimate that occurs at the start of a call or when a handoff to a new cell occurs. It is at these instances that there is no historical filter data to provide normal channel quality estimates. Presently, there is no defined means for determining the quality of the channel at these instances.

Figure 2:
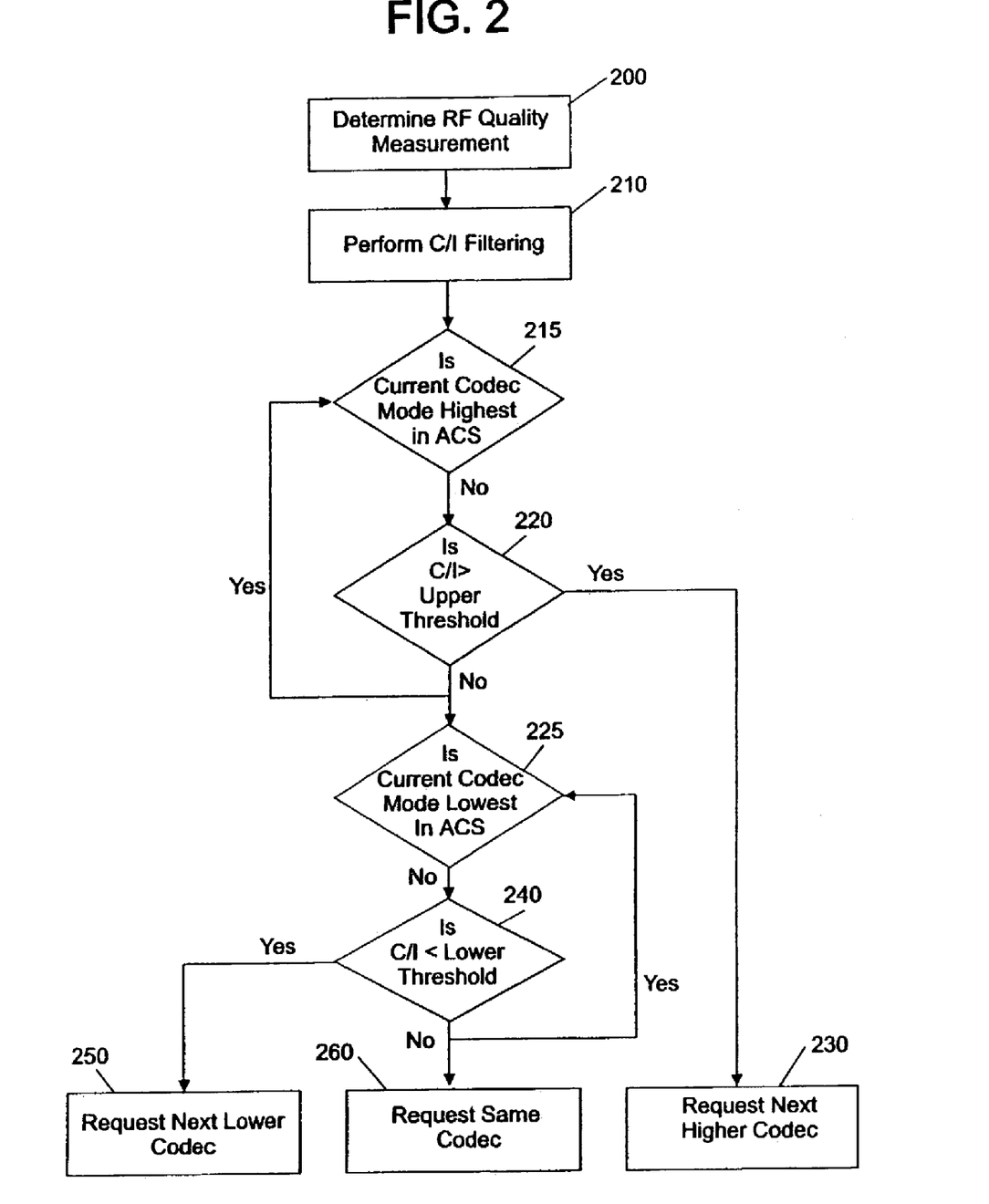
FIG. 2 is a flowchart describing a codec mode request under typical AMR conditions when there is an adequate filter state history for channel quality estimation.

There are several methods presented below for providing an initial channel quality estimate. Before presenting the initial channel quality estimation methods, it is useful to review a normal channel quality estimate method. FIG. 2 is a flowchart describing a codec mode request under typical AMR conditions when there is an adequate filter state history for channel quality estimation. The first step is to determine an RF quality measurement using either bursts or frames 200. Next, a C/I filter is applied to the measurements 210. The currently used codec mode is then checked to see if it is the highest mode from the ACS 215. If it is, check 220 is skipped. If not, the filtered C/I value is then compared to an upper threshold 220. If it exceeds the upper transition point, then the next higher codec is requested 230. If it does not exceed the upper threshold, then it is next checked to see if the current codec mode is the lowest from the ACS 225. If so, the same codec is requested 260. If not, the C/I value is checked against a lower threshold 240 provided the current codec mode is not the lowest in the ACS. If the C/I measurement is lower than the lower threshold, then the next lower codec is requested 250. Otherwise, if the C/I measurement is within the threshold tolerances, then the same codec is requested 260.

With respect to the process described above, the present invention is concerned with step 270, C/I filtering.

Figure 3:
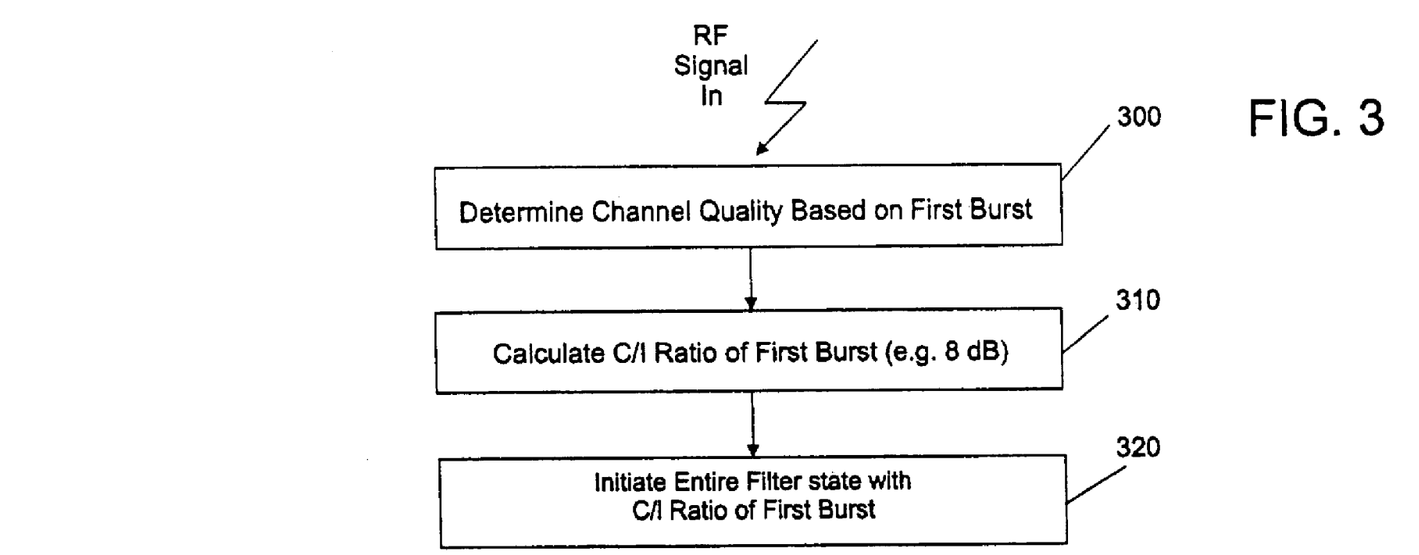
FIG. 3 illustrates one process for initializing the filter state in order to estimate channel quality.

The first initial channel quality estimate method is presented in FIG. 3. It essentially initializes the entire filter state with the first calculated C/I value as determined from the first received burst or frame. This method has the advantage of forcing the channel quality estimate to a steady-state value more quickly in most situations. For such situations, this method avoids the problem of setting an initial non-optimal codec when a new channel is assigned.

A received RF signal is analyzed to determine channel quality based on the first burst 300. A C/I ratio for the first burst is calculated 310. Once calculated, this C/I ratio (e.g., 8 dB) is used to fill all the taps in the filter state 320 and a codec is requested according to the process described in FIG. 2.

Figure 4:
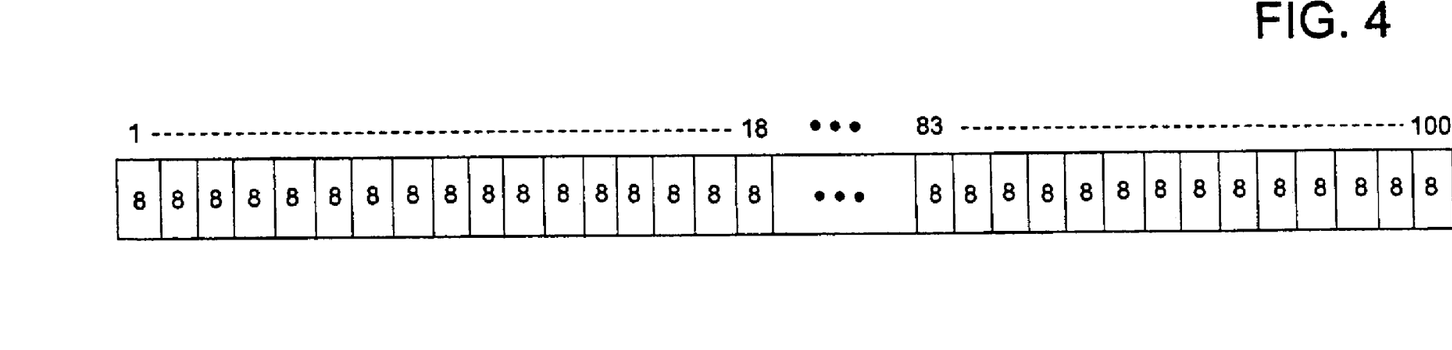
FIG. 4 is an illustration of the filter state just after initialization using the process of FIG. 3.

FIG. 4 is an illustration of the filter state just after initialization according to the process of FIG. 3. In this example, an 8 dB C/I ratio was calculated and initialized into all 100 taps of the filter state. A codec mode is then chosen based on this value. From this point forward, the filter state will be serially updated with actual values.

Initializing the filter with the first value may not always be optimal, however, since the variance of the channel quality measure can typically be quite high. This is particularly true in a faded environment and/or when frequency hopping is in use but may even be observed in a static single-frequency channel due to randomness in the estimation technique. Hence, a received burst may be estimated to have quality considerably higher or lower than those received even immediately before or after that burst. The purpose of the long channel quality estimation filter is to smooth this randomness.

If the first estimated channel quality measure is atypical for the channel, (i.e. an outlier), then the first calculated value method can lead to less than optimal results. The outlier will force a non-optimal codec rate. Because it fills the entire buffer, this codec mode will be used for a considerable amount of time as the filter fills with new channel estimates and the filtered value forces a change to a more optimal codec.

Another method for initializing the filter begins similarly to the previous method where the filter is filled with the first calculated value. However, subsequent channel quality estimates fill the filter state proportionally. This is termed the proportional fill method. So, when available, the second channel quality estimate fills the second half of the filter state leaving the first channel quality estimate in the first half of the filter state. Likewise, the third channel quality C/I estimate fills the last third of the filter state while the second estimate fills the second third of the filter state and the first estimate fills the first third of the filter state. This procedure continues until the filter is filled with values corresponding to separate estimates at which point the filter would be run normally.

Figure 5:
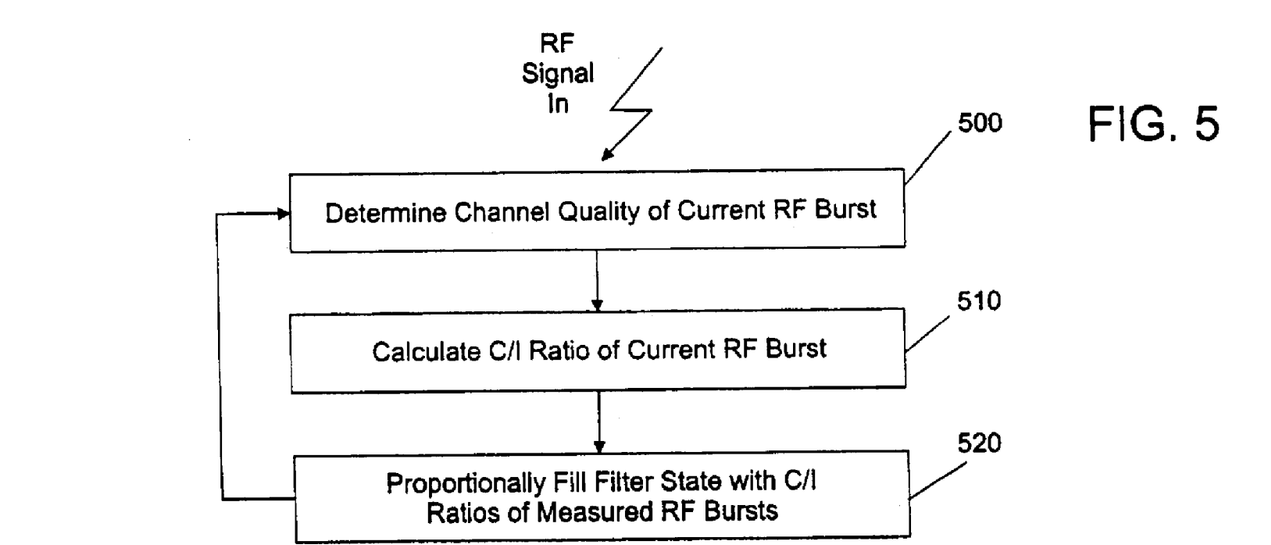
FIG. 5 illustrates another process for initializing the filter state in order to estimate channel quality.
Figure 6:
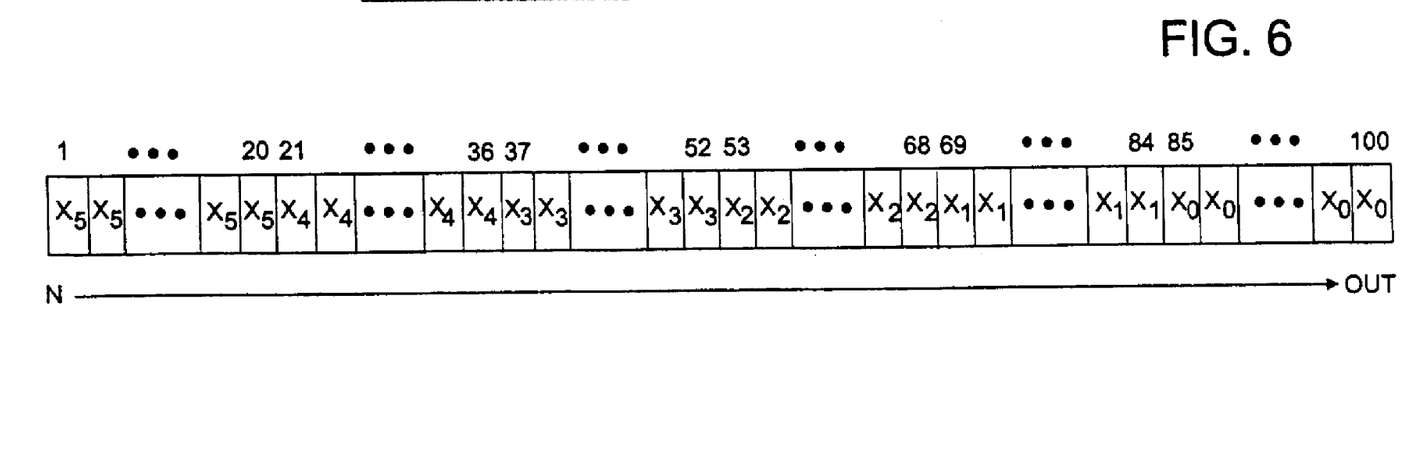
FIG. 6 is an illustration of the filter state after six channel quality estimates have been obtained using the process of FIG. 5.

FIG. 5 illustrates the proportional fill process for initializing the filter state in order to estimate channel quality when the underlying C/I estimation is performed burst-wise. The current RF burst is measured 500 for channel quality and a C/I ratio is calculated 510. If the current burst is the first burst then the filter state is completely filled with this channel quality estimate 520. The process is repeated for each new burst. As new C/I ratios for new bursts are determined they are proportionally filled into the filter state. FIG. 6 is an illustration of the filter state after six channel quality estimates have been obtained using the process of FIG. 5. Thus, each C/I ratio represents $1/6^{th}$ of the filter state since, in our example, six channel quality measurements have been obtained. This is shown in FIG. 6 where the C/I values have been labeled from $X_0$ to $X_5$.

The proportional fill method recognizes that each new channel quality measurement may create a situation where the total number of channel quality measurements is not evenly divisible into the number of taps in the filter state. To accommodate such situations, the taps remaining after dividing the total number of taps by the current number of channel quality measurements are filled with the most recent channel quality measurement. For instance, a 100 tap filter that has a history of seven channel quality measurements would have each channel quality measurement occupying 14 taps leaving two taps unaccounted. These last two taps would be filled with the most recent channel quality measurement. The proportional fill method can be represented mathematically as: Integer (Total number of taps/current number of channel quality measurements), with the remaining taps being filled with the most recent channel quality measurement.

Moreover, the proportional fill method applies until the number of channel quality measurements is equal to ½ the total number of filter taps. When this threshold is reached, the filter is deemed to be in steady state and additional channel quality measurements are input to the filter on a one in/one out basis.

One skilled in the art will recognize that an equivalent result may be obtained by altering the filter itself. To begin, no filter would be used. After the second estimate, a one-tap filter would be used and so forth.

The proportional fill method is advantageous over the first calculated method in that it quickly finds the optimal codec in the typical case but it also quickly reduces the effect of outlying channel quality estimates. That is, the excessive weighting of the first estimate is more quickly diminished.

Yet another method for determining initial channel quality is to compute the value used to initialize the C/I estimate filter state for every AMR call and AMR handover using the ICM specified by the base station and appropriate threshold/ hysteresis parameters. In considering the ICM, the mobile takes advantage of the channel quality knowledge of the base station.

Figure 7:
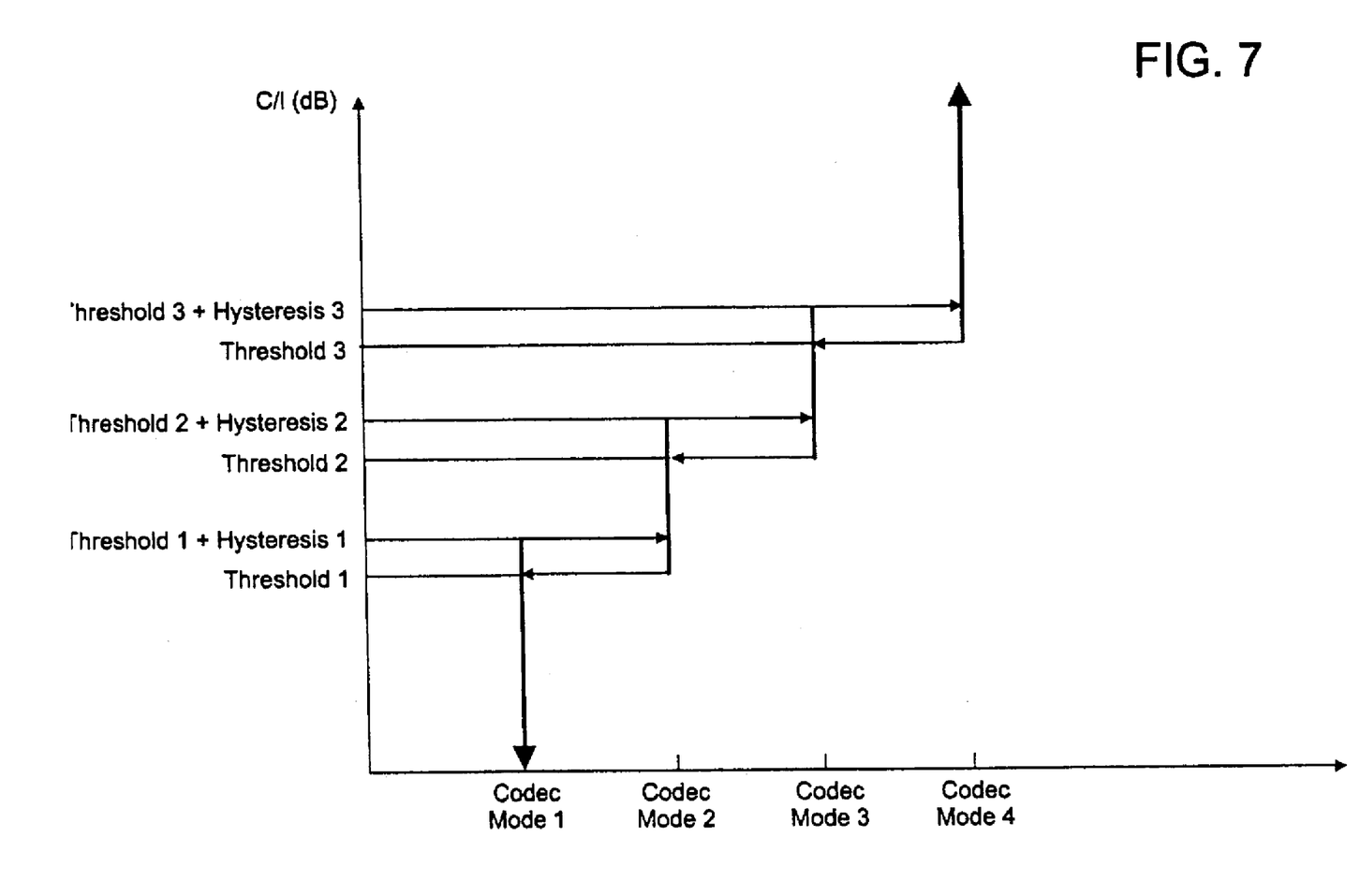
FIG. 7 identifies threshold and hysteresis points for each codec in an AMR system.

FIG. 7 illustrates the usage of threshold and hysteresis points for each codec mode in an AMR system. Each codec mode spans a specified C/I range of values (in dB) that is associated with channel quality. A higher C/I value indicates better RF channel quality and a lower higher C/I value indicates poorer RF channel quality. Codec modes that span the lower C/I values are configured to perform greater error correction for the speech signal while codec modes that span the higher C/I values require less error correction. The C/I ranges for each codec mode are bounded by an upper and lower threshold value and also contain small C/I overlaps between adjacent codec modes. The overlap range is set by hysteresis parameters.

While FIG. 7 has been illustrated with four codec modes, there can be fewer codec modes in a given AMR system. The number of codec modes does not affect the nature or operation of the present invention.

There can be many computational methods for initializing the filter state. One method is to initialize the filter state with the mean value of the upper and lower transition points corresponding to the ICM specified by the base station.

Figure 8:
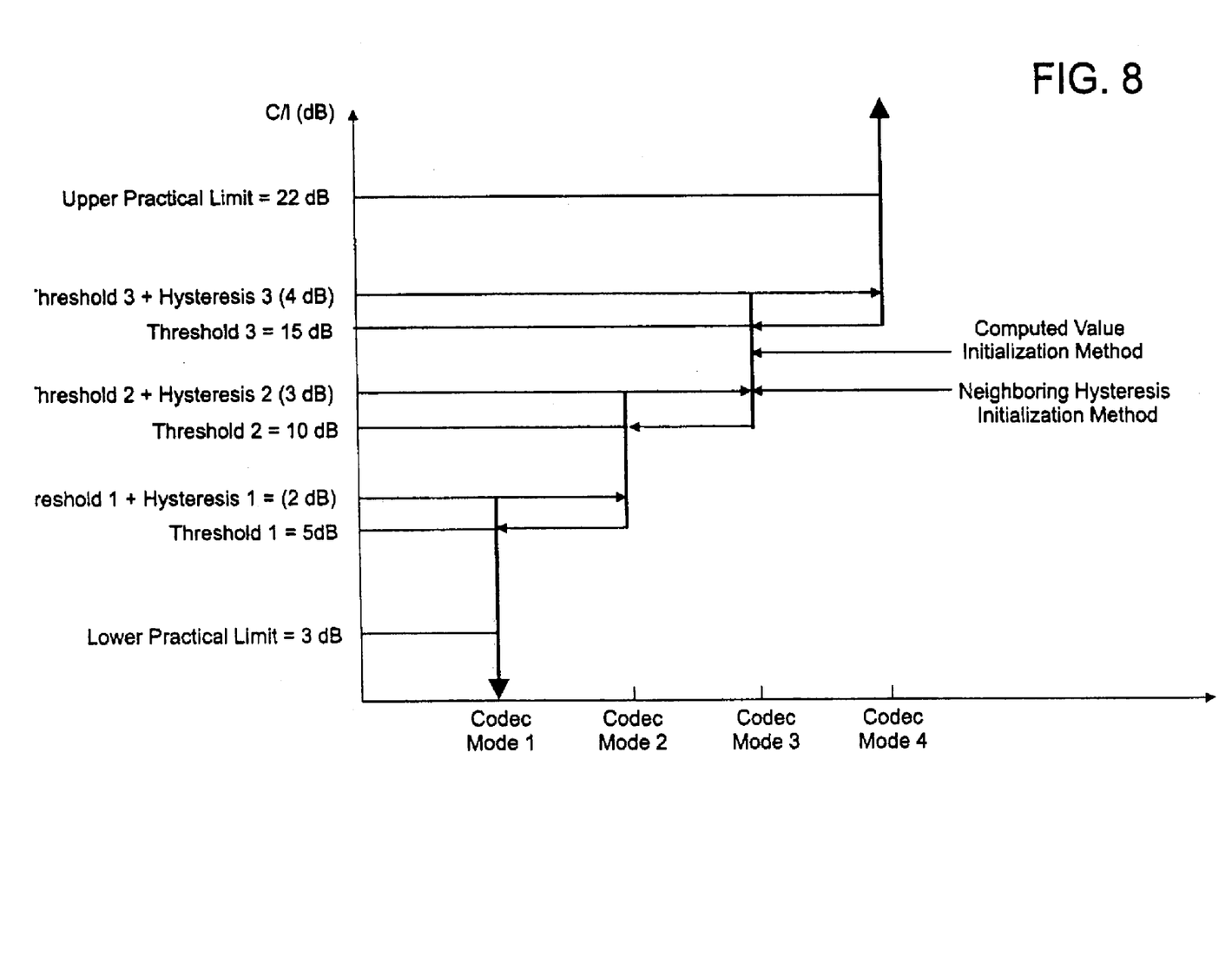
FIG. 8 illustrates the computed value and neighboring hysteresis methods for initializing the filter state.

Consider an example illustrated in FIG. 8 in which sample dB values have been applied to the codec mode threshold and hysteresis parameters. In the example, the base station specifies a fully provisioned ACS in which codec mode 3 is the ICM. From FIG. 8, it is known that the threshold values for codec mode 3 are 10 dB (threshold 2 value) and 19 dB (threshold 3 value+hysteresis 3 value). The computed mean for codec mode 3 is determined as (10 dB+19 dB)/2=14.5 dB. This is referred to as the computed value initialization method. Thus, all N taps of the filter state are initialized with a 14.5 dB value.

Another approach to compute the initialization value for this situation involves offsetting the transition point by the hysteresis of the neighboring lower codec. Again, consider the threshold and hysteresis parameters in FIG. 8 with the ICM being codec mode 3. The transition point from codec mode 2 to codec mode 3 is 10 dB and the hysteresis parameter for the overlap between codec modes 2 and 3 is 3 dB. Using the neighboring codec mode hysteresis offset method, the initial filter state would be filled with a (10 dB+3 dB=13 dB) value.

Still another approach includes a combination of the aforementioned techniques. Performance for the "Computed Value" method can be improved by considering a limited number of actual C/I measurements. Several C/I measurements could be used to determine a crude C/I estimate. Knowledge of actual channel quality allows the computed value to be further refined before it is used to initialize the filter state.

The computed value could be improved by a limited knowledge of the actual RF channel quality. If the initial C/I measurement(s) suggest RF channel quality is sufficient to support the next higher codec, the Computed Value is biased towards the ICM's upper transition point before initializing the filter state. This results in fewer actual measurements required before the mobile requests the next higher codec. Audio quality from the user's perspective is improved since a higher speech bit rate codec mode is requested sooner than with other methods.

Figure 9:
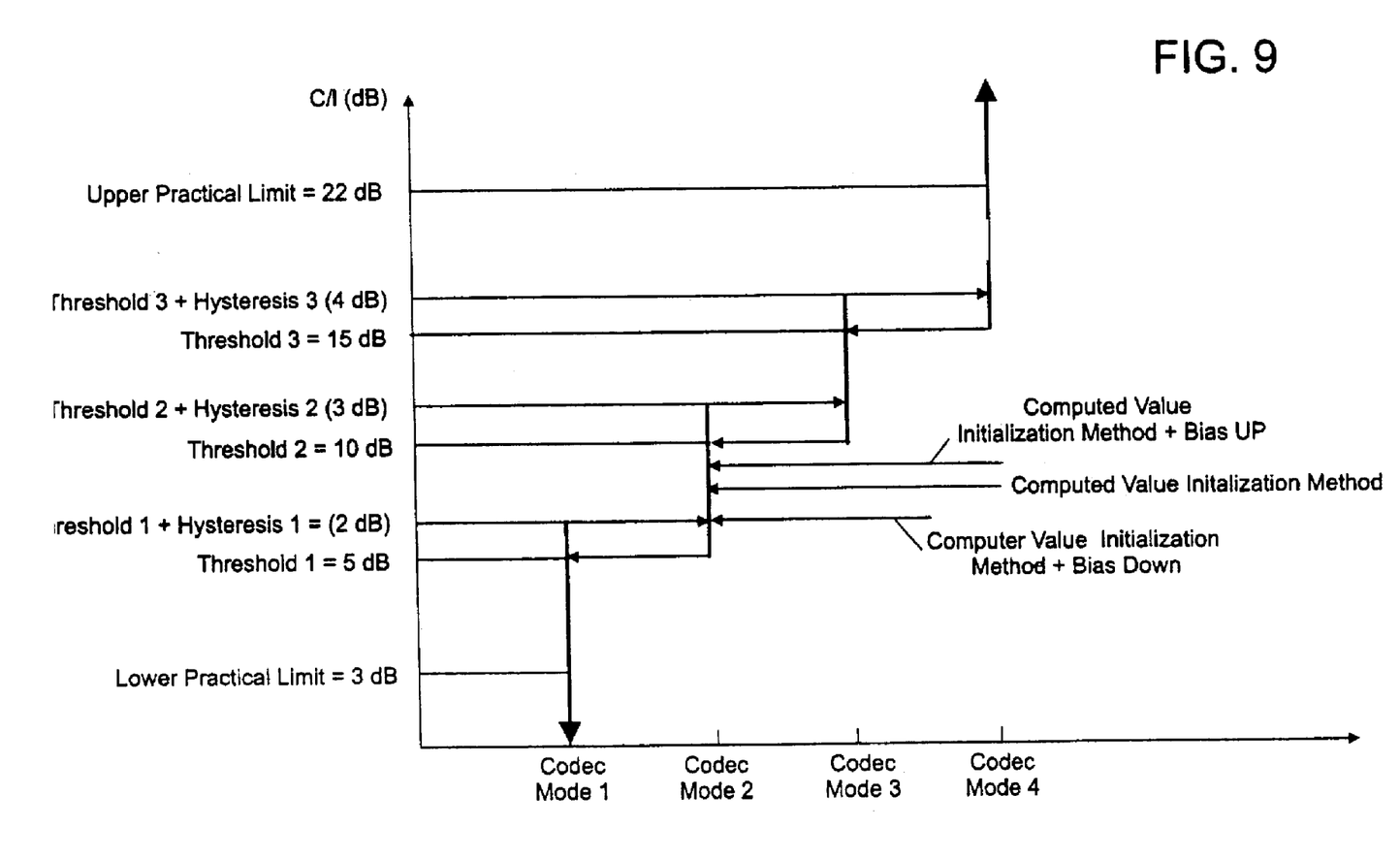
FIG. 9 illustrates the computed value plus bias method for initializing the filter state.

An advantage is also realized for the situation where the crude C/I estimate indicates RF channel quality is significantly less than the ICM's lower transition point. By biasing the "computed value" downward, a lower speech bit rate will be requested sooner than with other methods. Additional channel coding reduces dropped frames and thus improves the user's overall experience. The bias up and bias down approaches are illustrated in FIG. 9.

It is to be recognized by one skilled in the art that various combinations of the methods described above may also be used along with derivatives that are not explicitly discussed. The methods could be implemented in software (DSP or general-purpose microprocessor), hardware, or a combination.

It should also be noted that the term "receiver" as used herein refers to the receiving portion of a cellular transceiving device. A cellular transceiving device includes both a mobile terminal (MS) as well as a base station (BSS). A mobile terminal must be in communication with a base station in order to place or receive a call. There are numerous protocols, standards, and speech codecs that can be used for wireless communication between a mobile terminal and a base station.

Specific embodiments of the present invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for" are not intended to be read as means-plus-function elements, even if the claim otherwise includes the word "means".

The invention claimed is:

1. For purposes of selecting an optimal codec mode in a multi-rate service, a method of estimating initial channel quality in a receiver when a new channel is allocated, said method comprising:
   obtaining channel quality measurements;
   calculating a carrier-to-interference (C/I) value of the obtained channel quality measurements;
   dynamically initializing a filter comprised of N taps with the calculated C/I values; and
   filtering the C/I values to remove randomness thereby providing a better channel quality estimation for use in codec mode selection within the multi-rate service;
   wherein the step of dynamically initializing the filter with the calculated C/I values comprises:
   obtaining the number of codec modes for the multi-rate service from a base station that is in communication with the receiver;
   obtaining threshold and hysteresis values for the codec modes from the base station;
   obtaining the initial codec mode from the base station; and
   calculating a C/I value to be used to initialize all N taps of the filter based upon the threshold and hysteresis values of the codec modes together with the initial codec mode.

2. The method of claim 1 wherein the step of dynamically initializing the filter with the calculated C/I values comprises initializing all N taps of the filter with the first calculated C/I value.

3. The method of claim 1 wherein the step of dynamically initializing the filter with the calculated C/I values comprises proportionally filling the N taps with each calculated C/I value.

4. The method of claim 3 wherein each calculated C/I value occupies a number of taps equivalent to: Integer (n/current number of calculated C/I values), wherein any remaining taps are filled with the most recent calculated C/I value.

5. The method of claim 1 wherein the C/I initialization value is calculated according to the formula: $((TH_n+H_n)+TH_{n-1})/2$, in which
   $TH_n$ is the lower threshold value of the codec mode one higher than the initial codec mode; $TH_{n-1}$ is the lower threshold value of the initial codec mode; and
   $H_n$ is the hysteresis value for the overlap between the initial codec mode and the codec mode one higher than the initial codec mode.

6. The method of claim 1 wherein, when the initial codec mode obtained from the base station is the lowest codec mode, then the value to be used to initialize all N taps of the filter is calculated according to the formula: $(TH_n+TH_{LPL})/2$, in which $TH_n$ is the lower threshold value of the codec mode one higher than the initial codec mode; $TH_{LPL}$ is the lowest practical threshold value of the lowest codec.

7. The method of claim 1 wherein, when the initial codec mode obtained from the base station is the highest codec mode, then the value to be used to initialize all N taps of the filter is calculated according to the formula: $TH_{HPL}+(TH_{n-1}+H_{n-1})/2$, in which $TH_{n-1}$ is the lower threshold value of the initial codec mode; $H_{n-1}$ is the hysteresis value for the overlap between the initial codec mode and the codec mode one lower than the initial codec mode; and $TH_{HPL}$ is the highest practical threshold value of the highest codec.

8. The method of claim 1 wherein the C/I initialization value is calculated according to the formula: $TH_{n-1}+H_{n-1}$, in which $TH_{n-1}$ is the lower threshold value of the initial codec mode; and $H_{n-1}$ is the hysteresis value for the overlap between the initial codec mode and the codec mode one lower than the initial codec mode.

9. The method of claim 1 wherein, when the initial codec mode is the lowest codec mode, then the C/I initialization value is calculated according to the formula: $TH_n-H_n$, in which $TH_n$ is the lower threshold value of the codec mode one higher the initial codec mode; and $H_n$ is the hysteresis value for the overlap between the initial codec mode and the codec mode one higher than the initial codec mode.

10. The method of claim 1 wherein the filter is a finite impulse response (FIR) filter.

11. The method of claim 10 wherein the number of filter taps is dynamically set to the number of received bursts up until a maximum filter size is reached.

12. The method of claim 1 wherein the filter is an infinite impulse response (IIR) filter.

13. The method of claim 1 wherein the C/I value calculated is biased toward a neighboring codec based on a number of the most recent channel quality measurements.

14. For purposes of selecting an optimal codec mode in a multi-rate service, a system for estimating initial channel quality in a receiver when a new channel is allocated, said system comprising:
   means for obtaining channel quality measurements;
   means for calculating a carrier-to-interference (C/I) value of the obtained channel quality measurements;
   means for dynamically initializing a filter comprised of N taps with the calculated C/I values; and
   means for filtering the C/I values to remove randomness thereby providing a better channel quality estimation for use in codec mode selection within the multi-rate service;
   wherein the step of dynamically initializing the filter with the calculated C/I values comprises:
   means for obtaining the number of codec modes for the multi-rate service from a base station that is in communication with the receiver;
   means for obtaining threshold and hysteresis values for the codec modes from the base station;
   means for obtaining the initial codec mode from the base station; and
   means for calculating a C/I value to be used to initialize all N taps of the filter based upon the threshold and hysteresis values of the codec modes together with the initial codec mode.

15. The system of claim 14 wherein the step of dynamically initializing the filter with the calculated C/I values comprises initializing all N taps of the filter with the first calculated C/I value.

16. The system of claim 14 wherein the step of dynamically initializing the filter with the calculated C/I values comprises means for proportionally filling the N taps with each calculated C/I value.

17. The system of claim 16 wherein each calculated C/I value occupies a number of taps equivalent to: Integer (N/current number of calculated C/I values), wherein any remaining taps are filled with the most recent calculated C/I value.

18. The system of claim 14 wherein the C/I initialization value is calculated according to the formula: $((TH_n+H_n)+TH_{n-1})/2$, which $TH_n$ is the lower threshold value of the codec mode one higher than the initial codec mode; $TH_{n-1}$ is the lower threshold value of the initial codec mode; and $H_n$ is the hysteresis value for the overlap between the initial codec mode and the codec mode one higher than the initial codec mode.

19. The system of claim 14 wherein, when the initial codec mode obtained from the base station is the lowest codec mode, then the value to be used to initialize all N taps of the filter is calculated according to the formula: $(TH_n+TH_{LPL})/2$, in which $TH_n$ is the lower threshold value of the codec mode one higher than the initial codec mode; $TH_{LPL}$ is the lowest practical threshold value of the lowest codec.

20. The system of claim 14 wherein, when the initial codec mode obtained from the base station is the highest codec mode, then the value to be used to initialize all N taps of the filter is calculated according to the formula: $T_{HPL}+(TH_{n-1}+H_{n-1}))/2$, in which $TH_{n-1}$ is the lower threshold value of the initial codec mode; $H_{n-1}$ is the hysteresis value for the overlap between the initial codec mode and the codec mode one lower than the initial codec mode; and $TH_{HPL}$ is the highest practical threshold value of the highest codec.

21. The system of claim 14 wherein the C/I initialization value is calculated according to the formula: $TH_{n-1}+H_{n-1}$, in which $TH_{n-1}$ is the lower threshold value of the initial codec mode; and $H_{n-1}$ is the hysteresis value for the overlap between the initial codec mode and the codec mode one lower than the initial codec mode.

22. The system of claim 14 wherein, when the initial codec mode is the lowest codec mode, then the C/I initialization value is calculated according to the formula: $TH_n-H_n$, in which $TH_n$ is the lower threshold value of the codec mode one higher the initial codec mode; and $H_n$ is the hysteresis value for the overlap between the initial codec mode and the codec mode one higher than the initial codec mode.

23. The system of claim 14 wherein the filter is a finite impulse response (FIR) filter.

24. The system of claim 23 wherein the number of filter taps is dynamically set to the number of received bursts up until a maximum filter size is reached.

25. The system of claim 14 wherein the filter is an infinite impulse response (IIR) filter.

26. The system of claim 14 wherein wherein the C/I value calculated is biased toward a neighboring codec based on a number of the most recent channel quality measurements.

* * * * *